US009479566B2

(12) United States Patent
Ni et al.

(10) Patent No.: US 9,479,566 B2
(45) Date of Patent: Oct. 25, 2016

(54) METHOD AND APPARATUS FOR DOWNLOADING WEB PAGE CONTENT

(71) Applicant: TENCENT TECHNOLOGY (SHENZHEN) COMPANY LIMITED, Shenzhen (CN)

(72) Inventors: Haiying Ni, Shenzhen (CN); Yan Chen, Shenzhen (CN); Lixian Huang, Shenzhen (CN); Qi Luo, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 273 days.

(21) Appl. No.: 14/162,840

(22) Filed: Jan. 24, 2014

(65) Prior Publication Data
US 2014/0143377 A1 May 22, 2014

Related U.S. Application Data

(63) Continuation of application No. PCT/CN2012/078034, filed on Jul. 2, 2012.

(30) Foreign Application Priority Data

Jul. 26, 2011 (CN) .......................... 2011 1 0210934

(51) Int. Cl.
*H04L 29/08* (2006.01)
*G06F 17/30* (2006.01)

(52) U.S. Cl.
CPC ......... *H04L 67/06* (2013.01); *G06F 17/30861* (2013.01); *H04L 67/02* (2013.01)

(58) Field of Classification Search
CPC ....... H04L 41/00; H04L 43/00; H04L 51/00; H04L 61/00; H04L 65/00; H04L 67/00; H04L 69/00; H04L 67/02; H04L 67/06; G06F 17/30861
See application file for complete search history.

(56) References Cited

U.S. PATENT DOCUMENTS

7,519,902 B1 * 4/2009 Kraft ................. G06F 17/30864
715/234
2002/0178232 A1 * 11/2002 Ferguson ........... G06Q 30/0251
709/217

(Continued)

FOREIGN PATENT DOCUMENTS

CN 101079057 A 11/2007
CN 101114285 A 1/2008

(Continued)

OTHER PUBLICATIONS

International Search Report for Application No. PCT/CN2012/078034 dated Sep. 20, 2012.

(Continued)

*Primary Examiner* — Hitesh Patel
*Assistant Examiner* — Billy H Ng
(74) *Attorney, Agent, or Firm* — Harness, Dickey & Pierce, P.L.C.

(57) ABSTRACT

A method and apparatus for downloading web page content. The method comprises obtaining a downloading list containing the following content according to target downloading content that a user needs to download: web page link addresses corresponding to the target downloading content and sub-level web page link addresses of the web page link addresses; and when a condition of a downloading mode corresponding to the target downloading content is met, downloading the web page content according to the web page link addresses in the downloading list.

14 Claims, 5 Drawing Sheets

(56) References Cited

U.S. PATENT DOCUMENTS

| | | | |
|---|---|---|---|
| 2004/0210829 A1* | 10/2004 | Cristofari | G06F 17/30899 715/205 |
| 2005/0086364 A1* | 4/2005 | Muti | H04L 29/06 709/235 |
| 2007/0050413 A1* | 3/2007 | Kominek | G06F 17/30899 |
| 2009/0006308 A1 | 1/2009 | Fonsen | |
| 2009/0287684 A1* | 11/2009 | Bennett | G06F 17/30867 |
| 2009/0288141 A1* | 11/2009 | Khachaturov | G06F 21/577 726/3 |
| 2010/0161717 A1* | 6/2010 | Albrecht | H04L 67/2852 709/203 |
| 2011/0202646 A1* | 8/2011 | Bhatia | H04L 67/06 709/223 |
| 2011/0307467 A1* | 12/2011 | Severance | H04L 67/02 707/709 |

FOREIGN PATENT DOCUMENTS

| | | | |
|---|---|---|---|
| CN | 101222716 A | | 7/2008 |
| CN | 101222716 A | * | 7/2008 |
| CN | 101626554 A | | 1/2010 |
| CN | 101690128 A | | 3/2010 |
| CN | 101895967 A | | 11/2010 |
| CN | 101895967 A | * | 11/2010 |
| CN | 102065108 A | | 5/2011 |

OTHER PUBLICATIONS

Chinese Office Action for Application No. 201110210934.4 dated Dec. 3, 2014, and an English concise explanation of relevance thereof.

International Preliminary Report on Patentability for Application No. PCT/CN2012/078034 dated Jan. 28, 2014.

* cited by examiner

METHOD AND APPARATUS FOR DOWNLOADING WEB PAGE CONTENT

CROSS-REFERENCE TO RELATED APPLICATIONS

This application is a continuation of International Patent Application No. PCT/CN2012/078034 filed on Jul. 12, 2012. This application claims the benefit and priority of Chinese Patent Application No. 201110210934.4, filed Jul. 26, 2011. The entire disclosures of each of the above applications are incorporated herein by reference.

FIELD

The present disclosure relates to network communications and to a method and apparatus for downloading web page content.

BACKGROUND

This section provides background information related to the present disclosure which is not necessarily prior art.

With increasing development of wireless network communication technologies, more and more users of mobile terminals, such as cell phones, begin to browse web page content such as news, network e-books, and so on via WIFI (Wireless Fidelity) networks, GPRS (General Packet Radio Service) networks, 3G (3rd generation) networks. However, since mobility of mobile terminals is strong, when a mobile network environment is not good, browsing web page content may be affected. For example, some office workers may browse news every day by using their mobile phones when they commute by taking a subway, however, as network signals in subways are not good, they are often unable to open web page content or can only open it slowly; and further, in an environment without network, a user may be unable to browse web pages. For example, some iTouchs can only surf the internet in an environment with WIFI (e.g., at home, in a library, in a cafe, etc.), and can't continue to browse web pages once they switch to other environments without WIFI.

In an environment such as a bus, a subway, etc., the mobile network signal is unstable, in these scenarios, when a mobile terminal opens web page links, it tends to be unable to obtain web page content in time due to the network being disconnected, the network speed being slow, etc.

SUMMARY

This section provides a general summary of the disclosure, and is not a comprehensive disclosure of its full scope or all of its features.

The present disclosure provides a method and apparatus for downloading web page content so as to realize normally browsing web page content when mobile network signals are unstable.

The technical scheme is realized as follows.

A method for downloading web page content comprises:

obtaining a downloading list containing the following content according to target downloading content that a user needs to download: a web page link address corresponding to the target downloading content and sub-level web page link addresses of the web page link address; and when a condition of a downloading mode corresponding to the target downloading content is met, downloading the web page content according to the web page link addresses in the downloading list.

An apparatus for downloading web page content comprises an obtaining module and a downloading module; in which the obtaining module obtains a downloading list containing the following content according to target downloading content that a user needs to download: a web page link address corresponding to the target downloading content and sub-level web page link addresses corresponding to the web page link address; and the downloading module downloads the web page content according to the web page link addresses in the downloading list, when a condition of a downloading mode corresponding to the target downloading content is met.

As is seen from the above technical scheme, in the current disclosure, obtaining the downloading list according to the target downloading content and when a condition of a downloading mode corresponding to the target downloading content is met, downloading the web page content according to the downloading list, can realize downloading web page content that a user needs in advance when in an environment where the mobile network is good. Thus, when in an environment where the mobile network is unstable, since the web page content has been downloaded, normal browsing the web page content can be guaranteed so that browsing the web page content will not be limited by a current unstable network environment.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

A method provided by various embodiments will be described with reference to FIG. 1 as follows.

Figure 1:
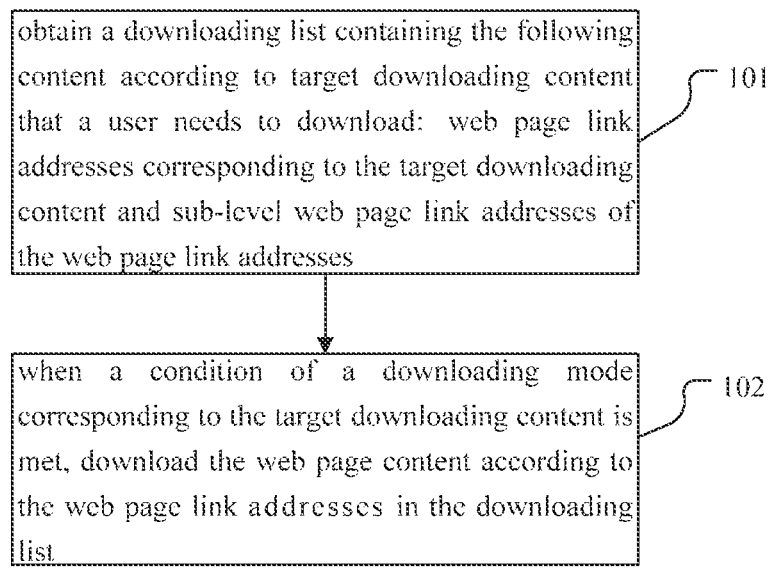
FIG. 1 shows a schematic diagram of a flow chart of a method for downloading web page content according to various embodiments.

FIG. 1 shows a flow chart for downloading web page content of various embodiments. As shown in FIG. 1, the method includes:

Block 101: a downloading list containing the following content is obtained according to target downloading content that a user needs to download: a web page link address corresponding to the target downloading content and/or sub-level web page link addresses of the web page link address.

The following is the description thereof, which takes the downloading list containing the web page link address corresponding to the target downloading content and the sub-level web page link addresses of the web page link address as an example, and for other situations, the principles thereof are similar to this.

Since when a mobile network environment is not good, it may influence a user to read and browse, based on this, as various embodiments, before execution of block 101, the target downloading content that the user needs and a downloading mode by using which the target downloading content is downloaded (i.e., a downloading mode corresponding to the target downloading content) can be set in advance. In block 101, the above list can be obtained according to the target downloading content that the user needs to download when the mobile network environment is good, so as to subsequently download the web page content according to the web page link addresses in the downloading list. For detailed information thereof please refer to block 102. In this way, it is realized that a user can browse web page content smoothly in any network environment or even in an environment without network.

Block 102: when a condition of the downloading mode corresponding to the target downloading content is met, web page content will be downloaded according to the web page link addresses in the downloading list.

In block 102, the downloading mode can be one or several of the following: WIFI mode, timing mode, and user triggering mode.

Figure 2:
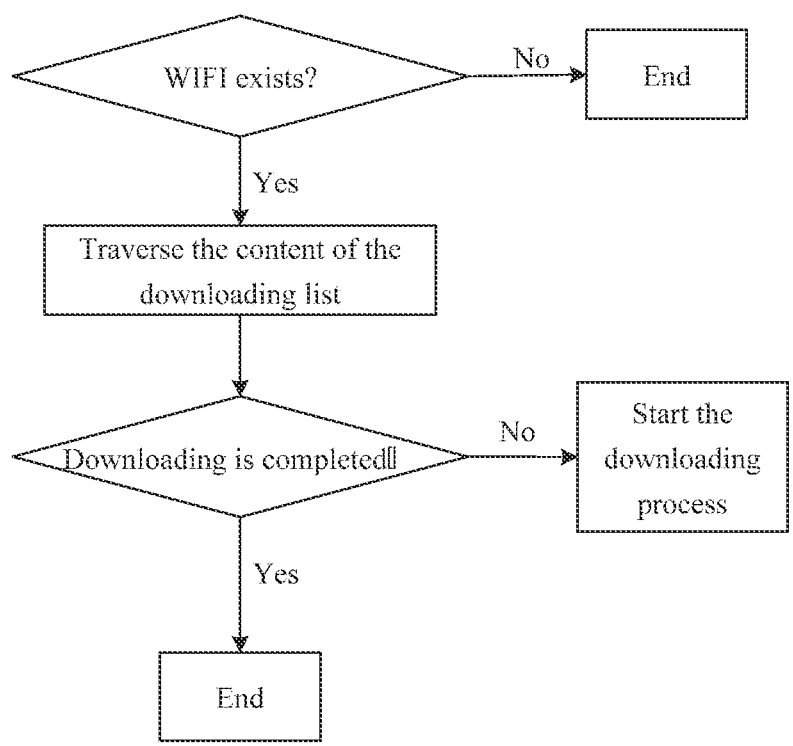
FIG. 2 shows a schematic diagram of a downloading flow in WIFI mode according to various embodiments.

FIG. 2 shows a downloading flow in the WIFI mode. In this mode, when the mobile terminal is in WIFI connection status, it automatically detects whether downloading the target downloading content set by the user has been completed, and if it has, then the downloading no longer continues, or if the downloading has not been started yet or there are tasks in the downloading list that have not been completed, then the downloading continues. The condition that meets the WIFI mode is: a WIFI network existing.

Figure 3:
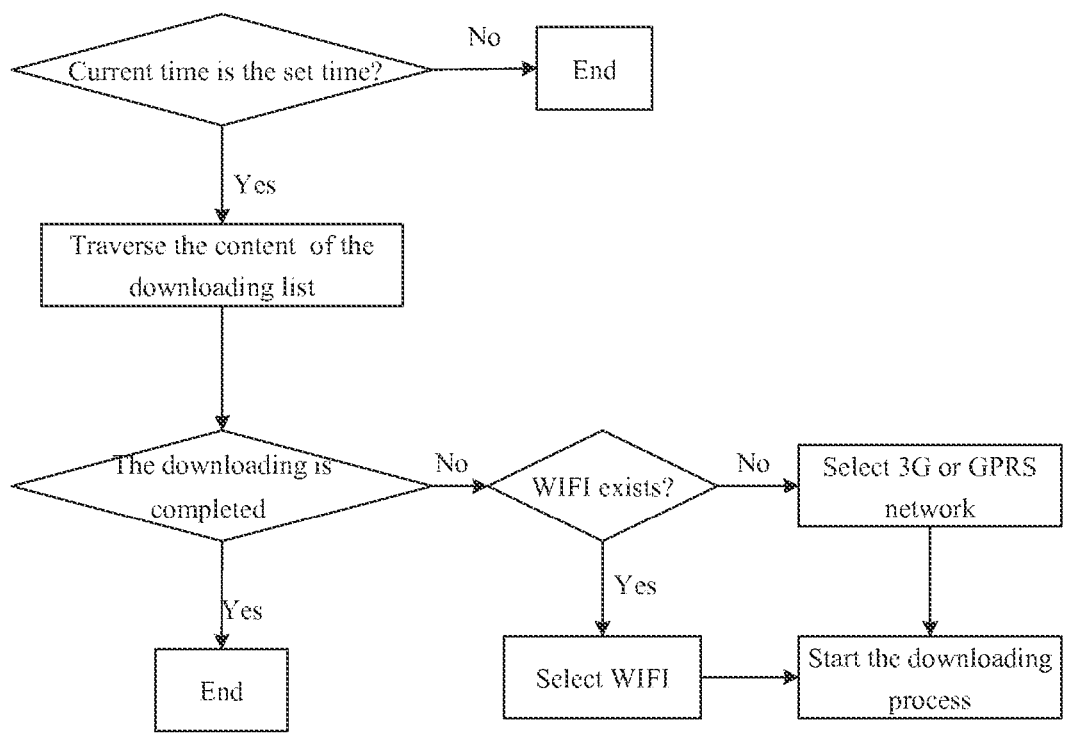
FIG. 3 shows a schematic diagram of a downloading flow in timing mode according to various embodiments.

FIG. 3 shows a downloading flow in the timing mode. In this mode, when specified time (e.g., 8:00 AM) arrives, the mobile terminal will automatically update the target downloading content set by the user, and at the moment, if there is WIFI, then the mobile terminal will connect to WIFI, and if there is no WIFI, then the mobile terminal will use GPRS, 3G network, etc. to download. The condition that meets the timing mode is: the specified time arriving.

Figure 4:
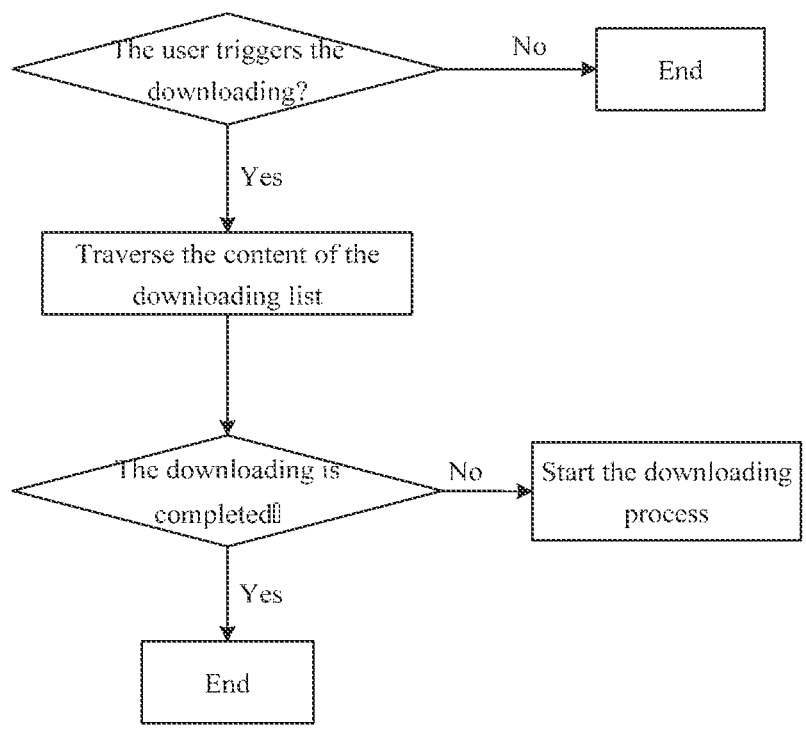
FIG. 4 shows a schematic diagram of a downloading flow in user triggering mode according to various embodiments.

FIG. 4 shows a downloading flow in the user triggering mode. In this mode, the mobile terminal provides a triggering entrance for the user, and if the user triggers this downloading mode, a link address selected by the user will be recorded and downloading will start backstage. The condition that meets the user triggering mode is: the downloading being triggered.

Now, the description of the flow shown in FIG. 1 is completed. Block 101 and block 102 shown in FIG. 1 will be described hereafter in detail:

In block 101, the target downloading content can be a web site such as www.qq.com, www.sina.com.cn, www.ifeng.com, etc., and the content of these sites can be downloaded backstage. The so called downloading backstage, simply, is downloading data without prompts of a user interface, which provides a mechanism of performing other operations along with the downloading.

Preferably, as extension of the various embodiments, the target downloading content can be channels or links of a web site. For example, several news links in www.qq.com are selected, and then the downloading thereof is performed. In this way, only news links specified by the user need to be downloaded and the amount of downloading is relatively less.

The above description intended for the target downloading content is just an example and should not be construed as limitations to the present disclosure.

Figure 5:
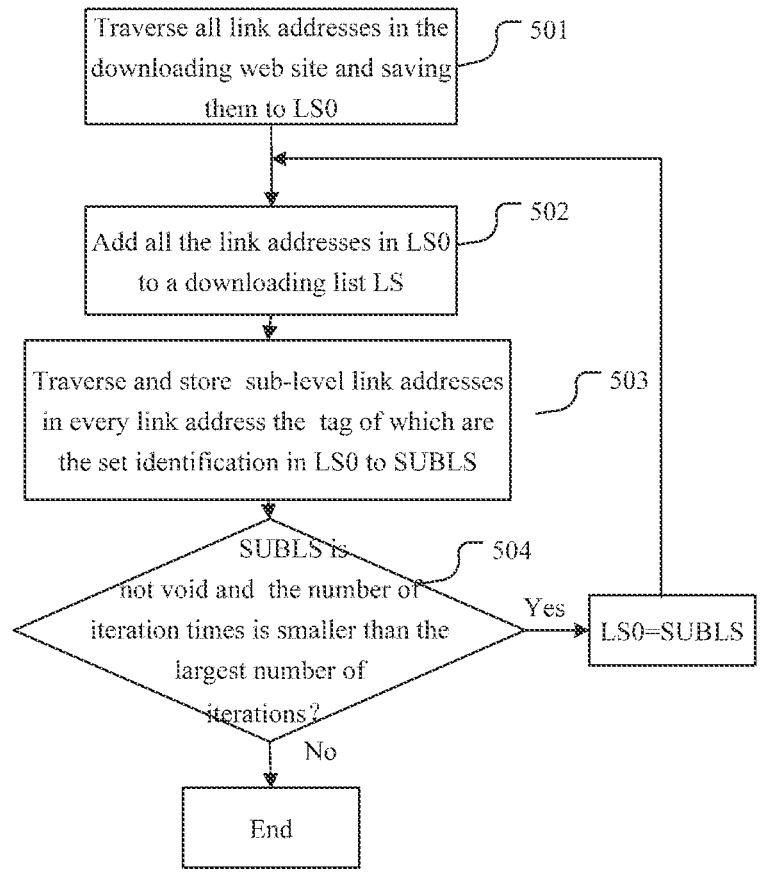
FIG. 5 shows a schematic diagram of a detailed flow of obtaining a downloading list according to various embodiments.

Further, in block 101, the downloading list can be obtained through multiple times of iteration. FIG. 5 provides a detailed example of obtaining the downloading list as follows.

FIG. 5 shows a schematic diagram of a detailed flow of obtaining a downloading list according to various embodiments. FIG. 5 is described by taking the target downloading content being a web site as an example, and for other situations, the principles thereof are similar to this.

As shown in FIG. 5, the flow includes:

Block 501: all link addresses in the web site to download are traversed and stored in LS0.

Block 502: all the link addresses in LS0 are added to a downloading list LS (LinkSet).

Block 503: all sub-level link addresses of every link address in LS0 the tag of which are set identification are traversed and stored in SUBLS.

If the tag of a link address is the set identification, then it means that there are sub-level link addresses in the link address. Specifically, the above set identification can be identification such as a next page, the next page, a next figure, the next figure, and all the remaining text, etc.

Block 504: it is determined whether SUBLS is void and whether the number of iterations is smaller than a preset largest number of iterations, and if SUBLS is not void and the number of iterations is smaller than the largest number of iterations, then iteration continues. That is, SUBLS is updated to be LS0 (i.e., LS0=SUBLS) and the flow returns to block 502. If SUBLS is void or the number of iterations is not smaller than the largest number of iterations, then the flow ends, and the content of all the link addresses in the current LS is the content that needs to download.

Now, the flow shown in FIG. 5 is completed.

In the following, the flow shown in FIG. 5 will be described by taking the target downloading content being set to be a web site as an example. At first, according to a link address of the web site, all web page link addresses corresponding to the link address (denoted as LinkSet_0) are obtained and stored in the downloading list (for example, if the link address to download is 3g.qq.com, then the content of LinkSet_0 is all the web page link addresses in 3g.qq.com); after that, the content of every web page link in LinkSet_0 is traversed, second level link addresses exist in every link are obtained, and if the tag of a second level link address is the above set identification, then the second level link address will be stored to the downloading list, and these second level link addresses are denoted as LinkSubSet_1. Then the web page content of every web page link in LinkSubSet_1 will be traversed and parsed, sub-level link addresses existing in every link are obtained, and for a sub-level link address the tag of which is the above set identification, such as a next page, the next page, a next figure, the next figure, all the remaining text, etc., the sub-level link address will be stored in the downloading list, and these sub-level link addresses are denoted as LinkSubSet_2. The iteration is repeated, until the list of LinkSubSet_N is void or until the number of iteration times is over a preset largest number of iteration times, MAXTimes, (e.g., 5 times, 10 times, etc.), then the iteration ends.

In the following, an expression of the link address and the tag in HTML format will be described by using two examples:

Example 1

<ahref="/p?i_url=http%3A/%2F%2Finfo.3g.qq.com%
2Fg%2Fs%3Faid%3Dtemplate%26tid%3Dsports_2011sjs%
26icfa%3Dhome_act%26s_it%3D1%26sid%
3DAaEBXTslCysaLjG1cEJfjvl_">
世锦赛丁俊晖12平21:30决战</a>

In example 1, the link address is the string following i_url, and the tag is 世锦赛 丁俊晖 2平 21:30 决战

Example 2

<ahref="/p?i_url=http%3A%2F%2Finfo50.3g.qq.com%
2Fg%2Fs%3Fsid%3DAaEBXTslCysaLjG1cEJfjvl_%
26aid%3Dsports_ss%26id%3Dsports_
20110430000456%26pos%3Dhome_C%
26icfaca%3Dhome_abcd%26s_it%3D1">
9球北京赛潘晓婷7-9爆冷出局</a>

In example 2, the link address is the string following i_url, and the tag is 9球北京赛 潘晓婷 -9 爆冷出局

Now, the description of block 101 is completed. As can be seen from block 101, besides of all the web page link addresses corresponding to the target downloading content such as a web site, a channel and/or a link, the downloading list further includes more relevant web page link addresses obtained by performing iteration for the web page link addresses. In this way, during execution of block 102, when the web page content is downloaded according to web page downloading addresses in the downloading list, besides of the target downloading content such as the content of a certain web site, content of all the links in the web site and content of the next page, a next page, etc., in all the links will be downloaded too, which guarantees that the range of the downloading content is broad.

Block 102 will be described in detail in the following.

In block 102, generally, the web page content is downloaded backstage according to the downloading list, and in the WIFI mode, as long as there is a network environment with WIFI, the backstage downloading will be started, and the content of the link addresses in the list, LinkSet, will be downloaded until the downloading is completed. In the timing mode, when the time arrives, the backstage downloading will be started, and the content of the link addresses in the list, LinkSet, will be downloaded until the downloading is completed, and in this mode, a WIFI environment is preferably chosen for downloading. In the user triggering mode, after the user triggers downloading, the backstage downloading will be started, and the content of the link addresses in the list, LinkSet, will be downloaded until the downloading is completed.

The process of downloading web page content according to the downloading list can be continuous or non-continuous. In other words, the mobile terminal can download all the web page content that needs to be downloaded at one time, or can download the web page content that needs to be downloaded in several times. Further, a largest downloading flow can be set, and when the flow of downloading the web page content is not smaller than the largest downloading flow, the downloading stops, so as to avoid the downloading fee exceeding the user's expectation.

Now, the description of block 102 is completed.

When the user reads web page content, if he clicks a link address in the downloading list such as LS shown in FIG. 5, e.g., link_1, the mobile terminal will process the web page content according to whether the web page content of link_1 having been downloaded or not, first determining whether the web page content of link_1 has been completely downloaded, and if it has, then displaying the web page content that has been downloaded to the local. If the web page content is being downloaded, then continuing the downloading, and after the downloading is completed, displaying the downloaded web page content; and if the downloading has not started yet, then pausing downloading tasks of web page content of other link addresses in LS if there are any, starting the downloading of link_1, and displaying the web page content after the downloading is completed. When the user clicks a link address in a non-downloading list such as LS shown in FIG. 5, the mobile terminal will pause downloading tasks of links in LS, start downloading of web page content of the link address clicked by the user, and after the downloading is completed and the web page content is displayed, continue the downloading tasks of the web page content of the link addresses in LS.

The method provided by various embodiments has been described in the above and the apparatus provided by the present disclosure will be described in the following.

Figure 6:
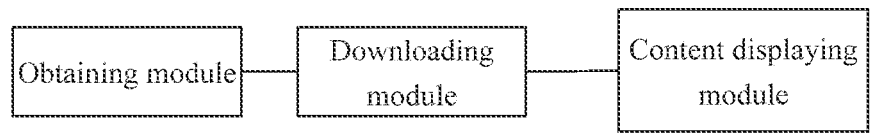
FIG. 6 shows a schematic diagram of a system for downloading web page content according to various embodiments.

FIG. 6 shows a structural schematic diagram of an apparatus for downloading web page content. As shown in FIG. 6, the apparatus for downloading web page content includes an obtaining module and a downloading module.

The obtaining module obtains a downloading list containing the following content according to target downloading content that a user needs to download: a web page link address corresponding to the target downloading content and sub-level web page link addresses of the web page link address.

The downloading module downloads web page content according to the web page link addresses in the downloading list when a condition of a downloading mode corresponding to the target downloading content is met.

Preferably, the target downloading content set in the user setting module may be one or several of the following: a web site, a channel, and a link.

The downloading mode includes one or several of the following: WIFI mode, timing mode, and user triggering mode, in which, the condition meeting the WIFI mode is an existing WIFI network; the condition meeting the timing mode is set time arriving; and the condition meeting the user triggering mode is downloading being triggered.

Preferably, the obtaining module obtains the downloading list via the following:

Block 1, traversing all web page link addresses corresponding to the target downloading content and storing them to a list LS0;

Block 2, adding every web page link address in the list LS0 to the downloading list;

Block 3, traversing sub-level web page link addresses in every web page link address, and if the tag of a traversed sub-level web page link address is set identification, then storing the sub-level web page link address to a list SUBLS. If the tag of a web page link address is the set identification, it means that there are sub-level link addresses in the web page link address; and Block 4, when SUBLS is not void and the number of iteration times is smaller than a preset number of times, continuing to execute the following iteration: updating SUBLS to LS0 and returning to Step 2, or otherwise, deeming all the web page link addresses in the current downloading list as the content that needs to download.

Preferably, the downloading module also, when the web page content requested by the user has not been downloaded, pauses a current process of downloading web page content according to the downloading list, downloads the web page content requested by the user, and after the downloading is completed, continues to execute the process of downloading the web page content according to the downloading list.

As shown in FIG. 6, the system also includes a content display module, which displays the web page content of the request downloaded by the downloading module.

Various embodiments can be used in scenarios such as cell phone browsing, news reading APPs, products such as Weibo, cell phone mail boxes, etc. In various embodiments, content set by the user is downloaded in advance according to the setting of the user when the network environment is good, and the user can smoothly browse in any environment with or without a network, so as to make the browsing and reading of the user is not limited to a current network environment, and various embodiments can provide different modes of downloading to meet different requirements of the user.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for downloading web page content, wherein the method comprises:

obtaining a downloading list containing the following content according to target downloading content to be downloaded;

web page link addresses corresponding to the target downloading content and sub-level web page link addresses of the web page link addresses; and in response to determining that a condition of a downloading mode corresponding to the target downloading content is met, downloading the web page content according to the web page link;

wherein obtaining the downloading list according to the target downloading content comprises:

block 1, traversing the web page link addresses corresponding to the target downloading content and storing the web page link addresses to a list LS0;

block 2, adding every web page link address in the list LS0 to the downloading list;

block 3, traversing sub-level web page link addresses in every web page link address, and if a tag of a traversed sub-level web page link address is identified, storing the traversed sub-level web page link address to a list SUBLS, wherein if a tag of a web page link address is identified, determining that the web page link address has a sub-level web page link address; and block 4, continuing to execute the following iteration in response to determining that the list SUBLS is not void and the number of iteration times is smaller than a preset number of times: updating the list SUBLS to the list LS0 and returning to the block 2, or otherwise, ending the current flow.

2. The method for downloading web page content according to claim 1, wherein the downloading mode comprises one or several of the following: WIFI mode, timing mode, and user triggering mode;

wherein the condition meeting the WIFI mode is: an existing WIFI network; the condition meeting the timing mode is: set time arriving; and the condition meeting the user triggering mode is: downloading being triggered.

3. The method for downloading web page content according to claim 1, wherein the method further comprises:

receiving a request for the web page content, in response to determine that the web page content of the request corresponds to a web page link address in the downloading list, processing the request according to whether the web page content of the request having been downloaded or not; and in response to determine that the web page content of the request does not correspond to any web page link address in the downloading list, then pausing a current process of executing web page content downloading according to the downloading list, starting to download the web page content of the request, and after the downloading is completed, displaying the web page content of the request and continuing the process of executing the web page content downloading according to the downloading list.

4. The method for downloading web page content according to claim 3, wherein processing the request according to whether the web page content of the request having been downloaded or not comprises:

in response to determine that the web page content of the request has been completely downloaded, then displaying the web page content of the request;

in response to determine that the web page content of the request is being downloaded, then waiting until the downloading is completed and displaying the web page content of the request; and in response to determine that the web page content of the request has not been downloaded yet, then pausing a current process of downloading other web page content according to the downloading list, downloading the web page content of the request, and after the downloading is completed, displaying the web page content of the request, and continuing the process of downloading other web page content according to the downloading list.

5. The method for downloading web page content according to claim 1, wherein the method further comprises: in response to determining that a flow of downloading the web page content is not smaller than a preset largest downloading flow, stopping the downloading.

6. An apparatus for downloading web page content, comprising a processor and a non-transitory computer-readable storage medium with instructions stored thereon, that when executed by the processor, perform a method comprising the steps of:
   obtaining a downloading list containing the following content according to target downloading content to be downloaded: web page link addresses corresponding to the target downloading content and sub-level web page link addresses of the web page link addresses; and
   downloading the web page content according to the web page link addresses in the downloading list, in response to determining that a condition of a downloading mode corresponding to the target downloading content is met;
   wherein obtaining the downloading list according to the target downloading content comprises:
   block 1, traversing the web page link addresses corresponding to the target downloading content and storing the web page link addresses to a list LS0;
   block 2, adding every web page link address in the list LS0 to the downloading list;
   block 3, traversing sub-level web page link addresses in every web page link address, and if a tag of a traversed sub-level web page link address is identified, storing the traversed sub-level web page link address to a list SUBLS, wherein if a tag of a web page link address is identified, determining that the web page link address has a sub-level web page link address; and
   block 4, continuing to execute the following iteration in response to determine that the list SUBLS is not void and the number of iteration times is smaller than a preset number of times: updating the list SUBLS to the list LS0 and returning to the block 2, or otherwise, ending the current flow.

7. The apparatus for downloading web page content according to claim 6, wherein the downloading mode comprises one or several of the following: WIFI mode, timing mode, and user triggering mode, wherein the condition meeting the WIFI mode is: an existing WIFI network; the condition meeting the timing mode is: set time arriving; and the condition meeting the user triggering mode is: downloading being triggered.

8. The apparatus for downloading web page content according to claim 6, wherein the method further comprises:
   receiving a request for the web page content,
   in response to determine that the web page content of the request corresponds to a web page link address in the downloading list, processing the request according to whether the web page content of the request having been downloaded or not; and
   in response to determine that the web page content of the request does not correspond to any web page link address in the downloading list, then pausing a current process of executing web page content downloading according to the downloading list, starting to download the web page content of the request, and after the downloading is completed, displaying the web page content of the request and continuing the process of executing the web page content downloading according to the downloading list.

9. The apparatus for downloading web page content according to claim 6, wherein the method further comprises:
   displaying the requested web page content downloaded.

10. The method for downloading web page content according to claim 2, wherein the method further comprises: in response to determine that a flow of downloading the web page content is not smaller than a preset largest downloading flow, stopping the downloading.

11. The method for downloading web page content according to claim 1, wherein the method further comprises: in response to determine that a flow of downloading the web page content is not smaller than a preset largest downloading flow, stopping the downloading.

12. The method for downloading web page content according to claim 3, wherein the method further comprises: in response to determine that a flow of downloading the web page content is not smaller than a preset largest downloading flow, stopping the downloading.

13. The method for downloading web page content according to claim 4, wherein the method further comprises: in response to determine that a flow of downloading the web page content is not smaller than a preset largest downloading flow, stopping the downloading.

14. The apparatus for downloading web page content according to claim 8, wherein the method further comprises:
   displaying the requested web page content downloaded.

* * * * *